July 29, 1969    P. MEIER    3,457,973
CARRIAGE FOR MACHINES ADAPTED TO REMOVE BARK AND BRANCHES
FROM TREE TRUNKS
Filed July 20, 1967    4 Sheets-Sheet 1

INVENTOR.
Paul Meier
BY Jab Hein
Agent

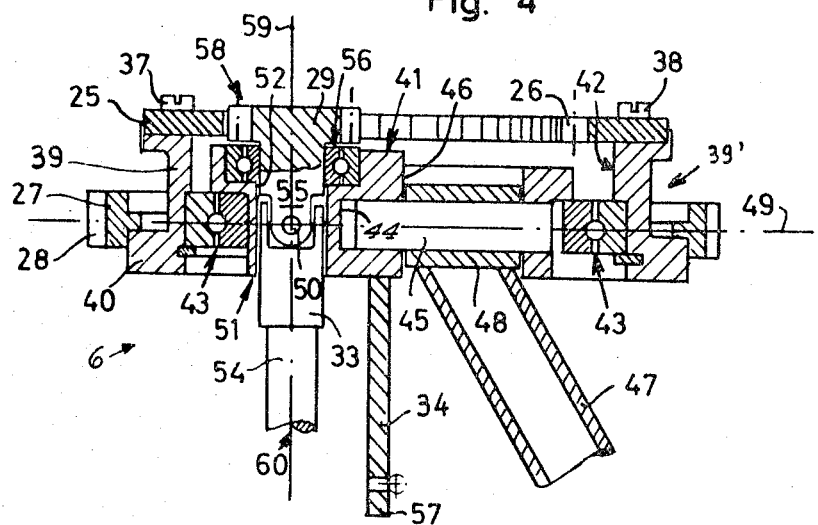
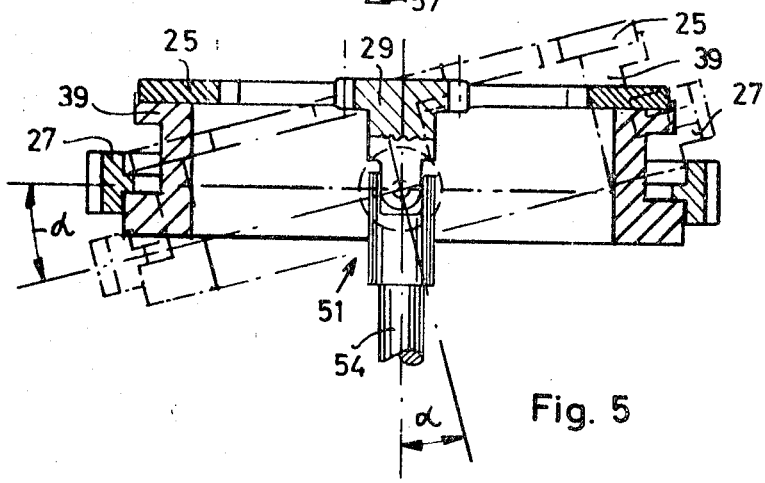

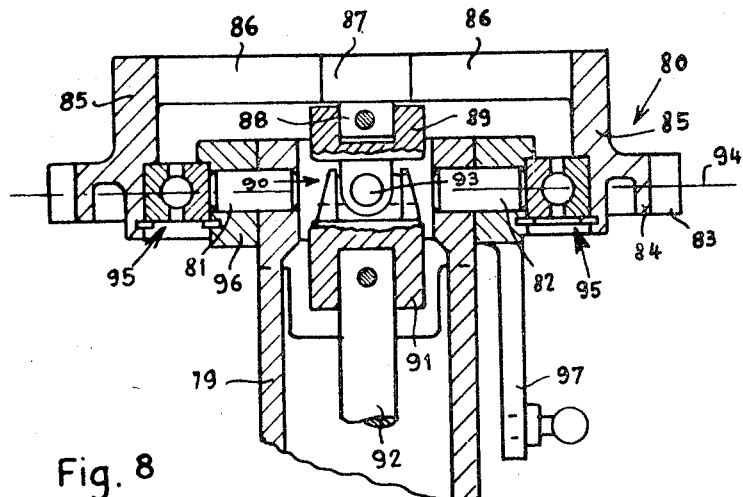
Fig. 8
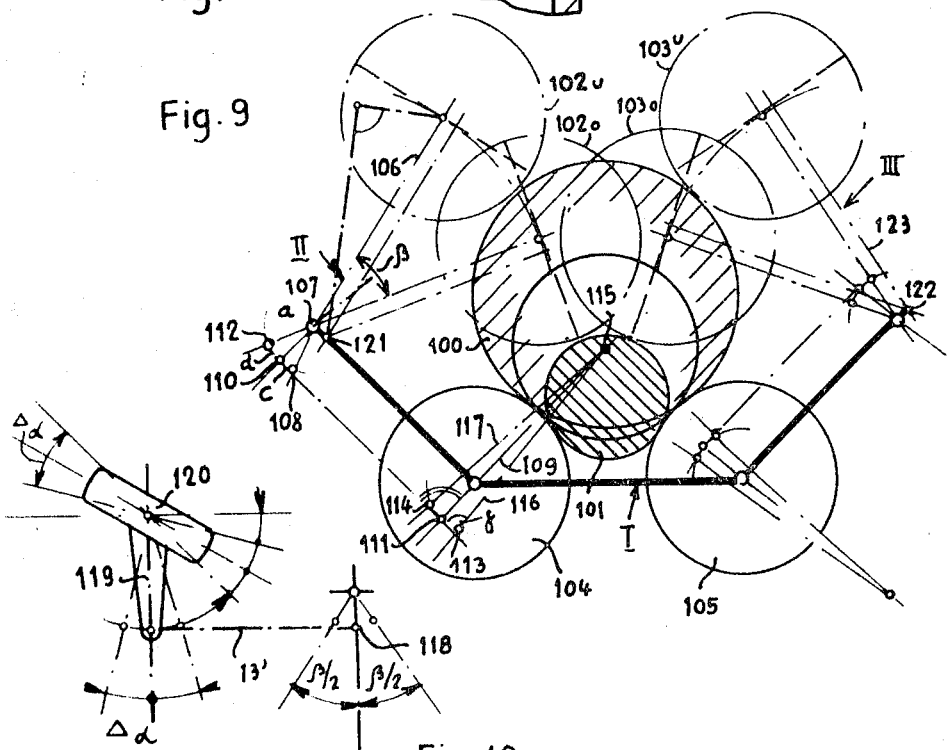
Fig. 9
Fig. 10
INVENTOR.
Paul Meier
BY Zabthein
Agent 3,457,973
CARRIAGE FOR MACHINES ADAPTED TO REMOVE BARK AND BRANCHES FROM TREE TRUNKS
Paul Meier, Munchenstein, Switzerland, assignor to Hans Heid, Riehen, Switzerland
Filed July 20, 1967, Ser. No. 654,832
Claims priority, application Switzerland, July 25, 1966, 10,829/66
Int. Cl. B27c 9/00; B27m 3/00
U.S. Cl. 144—2       10 Claims

ABSTRACT OF THE DISCLOSURE

A carriage for machines adapted to remove bark and/or branches from tree trunks, and an arrangement wherein the carriage is subdivided into at least two pivotally interconnected sections engaging the tree trunk through the wheels of said sections, the wheels being angularly set so as to engage the tree trunk along helical lines. Said angular setting of the wheels is such that the pitch of said helical lines never rises above the operative length of the bark or branch removing tool, said pitch being preferably substantially constant whatever may be the peripheral size of the trunk cross-section engaged by the wheels. Each wheel is advantageously adapted to rock round a diameter aligned with reference to the point of contact between the wheel and the tree trunk and lying in a plane passing through the axis of said trunk when the carriage is at mid-height of its operative vertical movement.

---

The invention has for its object an arrangement for shifting the wheels of the carriage of machines and apparatus removing branches and/or bark from standing trees.

Apparatus for the removal of the bark from standing trees are known, the carriage of which is designed in a manner such that it engages and clamps the tree trunks from which the bark is to be removed while its wheels run helically round the tree trunk so that said carriage is moved upwardly and downwardly during its rotation round the trunk.

The drawback of the prior arrangements resides in that the angular setting of the wheels running along the trunk remains unaltered whereas the angle should increase gradually as the wheels rise along the tree during their rotation. When the wheels engage trunks of smaller diameters, said angle should be larger than when they engage trunks of a larger diameter. The reason therefor consists in that the apparatus operates with a bark-removing tool of a given length, which tool engages longitudinally a generating line of the conical surface of the tree trunk and removes during its movement round the trunk a bark strip of a uniform breadth.

Now, if the pitch of the path of the carriage wheels moving along the tree trunk corresponds exactly to the length of the bark-removing tool during the first revolution of the tool round the tree trunk, a further rise of the tool along the conical surface defining the tree trunk will cause an increasing overlapping of the convolutions of the strip formed by the removed bark or, otherwise stated, the pitch gradually decreases. Consequently, the actual surface from which the bark is removed during one revolution of the carriage becomes gradually smaller, and the surface of the tree which has already been freed of its bark can in fact be damaged by the bark-removing tool in a useless and undesired manner.

In the case of known machines adapted to cut off the branches of standing trees, which machines move upwardly and downwardly along a helical line drawn along the conical surface of a tree trunk, the convolutions of the treated band travelled over by the sawing cutter, extending preferably in parallelism with the adjacent generating line of the trunk surface, overlap increasingly when the adjustment of the angular setting of the wheels remains constant. Consequently, the speed with which the machine operates over a predetermined height of trees is reduced with reference to that which could be obtained with a machine providing a constant pitch or operating at least with wheels the angular setting of which increases to a certain extent.

The present invention has therefore for its object an arrangement for shifting the wheels of the carriage of machines and apparatus adapted to remove the branches and/or bark from standing trees wherein the angular setting of the wheels is adjusted in accordance with the diameter of the tree trunk to be treated at the point of engagement of the wheels with the tree, and is modified for a given tree trunk as the apparatus rises along the latter in a manner such that said angular setting is larger for small tree diameters and smaller for larger tree diameters, its value being advantageously such that the pitch remains constant.

The arrangement according to the invention serves consequently for shifting the wheels of the carriage of machines and apparatus adapted to remove the branches and/or bark from standing trees, wherein a first section of the carriage is provided with a driving motor and with a shifting mechanism controlled by said motor and operating on at least one shiftable wheel, while at least one further carriage section is designed in a manner such that it can rock with reference to the first section round a pivotal axis so that a tree trunk may be clamped between the carriage sections.

Furthermore the wheels are fitted on the carriage sections in a manner such that they hold said sections spaced with reference to the clamped tree trunk and can engage the tree trunk and run along the latter, at least the driven wheels being set as concerns their direction of progression in a manner such that they run upwardly and downwardly over the conical surface of the tree trunk along helical lines surrounding said trunk.

According to the invention, the driven wheel or wheels and the loose wheels set positively in the desired angular position are adjustably fitted as concerns their direction of progression. At the same time, arrangements are provided through which the carriage wheels, which are thus adjustable as concerns their direction of progression, are shifted automatically in accordance with the relative position of the two or of two carriage sections adapted to pivot round a common pivotal line upon engagement with a tree trunk in a manner such that said wheels engage the conical surface of a given clamped tree along the largest possible cross-section corresponding to the relative position of the carriage sections at the point of engagement so as to move along helical lines the angular setting of which ensures at said point of engagement a pitch which is equal at a maximum to the length of the operative tool in the direction of a generating line of the conical surface of the tree trunk.

Upon further rocking of the two carriage sections towards each other, as the carriage is shifted upwardly along the clamped tree, said angular setting increases gradually in a manner such that the pitch remains at a maximum equal to the value of the length of the tool along a generating line of the conical surface of the trunk.

The accompanying drawings illustrate a preferred embodiment of the invention to be disclosed hereinafter. In said drawings:

FIG. 4 is, on a larger scale, a cross-section through line IV—IV of FIG. 1 of a driven wheel as seen in the direction of the arrows IV;

FIG. 5 is a somewhat schematic, simplified cross-section of FIG. 4 showing the toothed rim of the driven wheel for two different positions thereof corresponding to two different angular settings;

FIG. 8 is a cross-section passing through the pivotal axis of a further embodiment of a driven carriage wheel;

FIG. 9 is a schematic sketch of selected parts of the carriage as projected on a reference plane perpendicular to the medial axis of the tree trunk or of a conical surface engaged by the carriage so as to show the cooperation between said parts for a graphic definition or calculation of the size of the wheel-shifting lever of the arrangement for a given structure of the carriage; and FIG. 10 is a detail relating to the arrangement providing a constant pitch.

Figure 1:
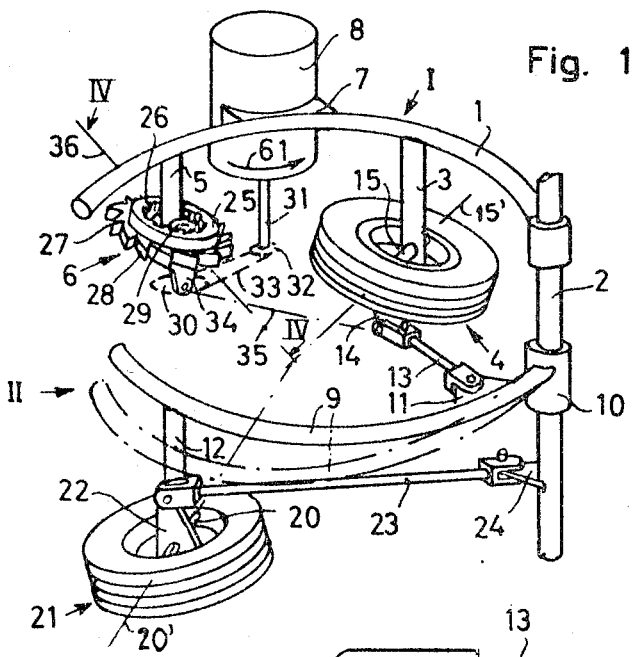
FIG. 1 is a schematic perspective view of a section of a carriage for a machine or apparatus adapted to remove bark and/or branches from tree trunks, said carriage including two sections provided each with wheels.

In FIG. 1, a first carriage section I is constituted by a bent tube 1 rigidly secured to a straight upright tube 2 while a tubular extension 3 on said bent tube carries a loose wheel 4, while a further tubular extension 5 carries a driven wheel 6 and a lateral projection 7 carries a motor 8.

A second carriage section II illustrated in FIG. 1 is constituted by a further bent tube 9 pivotally carried by the above-mentioned tube 2 of the first carriage section through the agency of a sleeve 10 and carrying a flat transverse projection 11 and a tubular extension 12.

The flat projection 11 on the tube 9 carries pivotally one end of a shifting rod 13 the other end of which is secured to a lever 14 controlling the angular position of the loose wheel 4 so as to adjust its direction of running by a rocking thereof round a transverse pivot 15, having a line 15' passing therethrough.

Figure 2:
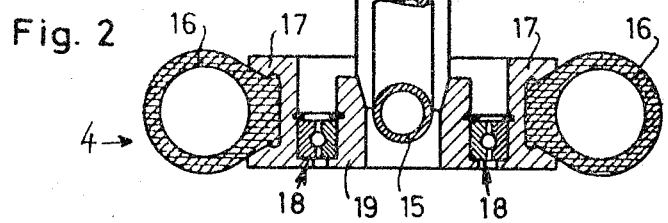
FIGS. 2 and 3 are vertical cross-sections on a larger scale of one of the loose carriage wheels of FIG. 1, said cross-sections perpendicular to the wheel pivot showing two positions corresponding to two different angular settings of the wheels.
Figure 3:
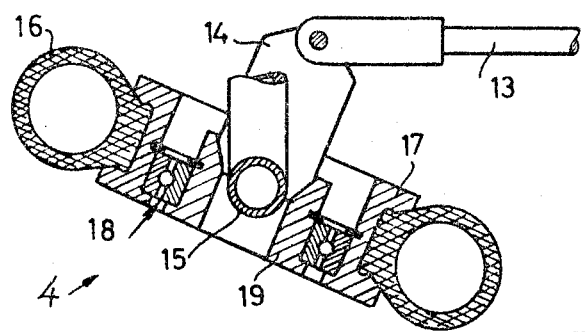

Said transverse pivot 15, the adjacent end of the tubular extension 3, the loose wheel 4, the control lever 14 and the adjacent end of the shifting rod 13 are illustrated on a larger scale in FIGS. 2 and 3, these figures being drawn upside down with reference to FIG. 1 and partly as schematic sectional views. They relate to wheel 4 as well as to a similar loose wheel 21, to be described hereunder.

A tire 16 of the wheel 4 is secured through a rim 17 to a wheel hub or support 19 with the interposition of a ball bearing 18, said hub being adapted to pivot under the action of the control lever 14 round the pivot 15 rigid with the tubular extension 3.

As illustrated in FIG. 1, a pivot 20 (with line 20' therealong) rigid with the tubular extension 12 carries another loose wheel 21 secured to a control lever 22 adapted to be shifted by a shifting link or rod 23 pivotally secured to a flat projection 24 upon relative rotation of the tube 9 with reference to the upright tube 2. The adjustment procedure corresponds to that of the other loose wheel 4. The two wheels 4 and 21 engage diametrically opposed points of the tree trunk and the planes in which they run slope in diametrically opposed directions. As apparent from inspection of FIG. 1, the axes of the pivot 15, of the wheel 4 and of the pivot 20 of the wheel 21 cross each other at a point lying within the space encompassed by the two carriage sections I and II adapted to pivot with reference to each other.

As illustrated in FIG. 1, the axis round which the driven wheel 6 is adjustable as will be disclosed hereinafter passes also through the crossing point between said axes of the pivots 15 and 20. Said crossing point should lie at least approximately along the longitudinal axis of the tree trunk to be treated.

The driven wheel 6 illustrated in a schematic perspective view in FIG. 1 includes a flat annulus 25 provided inwardly with teeth 26 and rigid with a toothed rim 27 extending underneath said annulus section and provided outwardly with teeth 28. The latter have for their object to rigidly anchor the carriage on the tree during the movement of said carriage along the tree trunk.

A pinion 29 engaging the inner teeth 26 on the flat annulus 25 is driven by a shaft 54 (FIG. 4) which is not illustrated in FIG. 1 and which carries a chain wheel 30. Said chain wheel is driven by the motor 8 through its shaft 31, a chain wheel 32 and a chain 33.

The driven wheel 6 is adjusted as concerns its direction of progression by a control lever 34 connected, as illustrated in FIG. 1, with the control lever 14 of the loose wheel 4 through the agency of a shifting mechanism 35 illustrated schematically by a dot-and-dash line. The driven wheel 6 can rock round a transverse axis 36 and I will now describe the mechanism driving and rocking said wheel, reference being made to FIGS. 4 and 5.

FIG. 4 is a cross-section through the wheel 6 of FIG. 1 along line IV—IV, said view being considered in the direction of the arrows IV. In FIG. 4, the flat annulus 25 of FIG. 1 provided with inner teeth 26 is secured by nuts 37 and 38 to a hollow sleeve 39 constituting a wheel body. To one flange 40 of said sleeve 39 is rigidly secured the toothed rim 27 provided with outer teeth 28 as illustrated in FIG. 1.

A core member 41 constituting a wheel support is fitted inside the sleeve 39 and engages the inner periphery 42 of the sleeve with the interposition of a ball bearing 43. Said member 41 is provided with a radial cylindrical recess 44 into which a round pivot 45 is inserted from outside and which is locked in position by the above mentioned ball bearing 43. The periphery of said radial pivot 45 is engaged by a free sleeve-shaped end 48 of a support 47 entering a rectangular recess 46 extending perpendicularly across the first-mentioned recess 44, said support 47 engaging the tubular extension 5 in a manner which is not illustrated.

The axis 49 of the recess 44 and of the pivot 45 extends diametrically across the toothed wheel 27 along a line crossing the medial annular line of the series of teeth 28 and the point of engagement thereof with the tree. Said axis 49 of the recess 44 passes through the center 50 of the connecting cross of a cardan joint 51 fitted in a transverse bore 52 of the inserted member 41, one element 53 of the cardan joint being connected with the aforementioned shaft 54 while another element 55 of the cardan joint 51 carries the pinion 29 or, as illustrated in FIG. 4, forms a unit therewith.

The pinion 29 engages the inner teeth 26 of the flat annulus 25 so as to drive the latter. Since the flat annulus 25 revolves in unison with the toothed rim 27, said pinion 29 transmits its rotation to the latter, the teeth of which engage the outer surface of the tree and bite into the wood whereby the upward and downward movements of the carriage are ensured.

The pinion is guided reliably while engaging the inner teeth 26 by a ball bearing 56 holding it together with its extension 55 forming an element of the cardan joint inside the inserted member 41 which in its turn is fitted inside the sleeve 39 with the interposition of the ball bearing 43, in a manner such that the engagement between the pinion 29 and the inner series of teeth 26 remains always operative.

The other element 53 of the cardan joint 51 extends with a clearance inside the inserted member 41.

The control lever 34 for the wheel 6 is again shown in FIG. 4. Said control lever 34 is rigid at one end with the inserted member 41 while its free end 57 is provided for engagement of the mechanism 35 illustrated in FIG. 1 in a merely schematic manner and in FIG. 6 as a shifting or adjusting rod 67, to be described later in more detail.

Upon shifting of the wheel 6 by means of the control lever 34, a system 58 including the inserted member 41, the ball bearing 43, the sleeve 39, the toothed rim 27 with its outer teeth 28, the annulus 25 with its inner teeth 26, the ball bearing 56 and the pinion 29, rocks in unison round the axis 49 so as to pass for instance out of the position illustrated in FIG. 4 for which the upper surface of the flat annulus 25 is perpendicular to the plane of the drawing, the rotation being executed round the pivot 45 while at the same time the shaft 54 retains its position in space. The system 58 rocks thus as a whole in a manner such that the axis 59 of the pinion 29 lies for any position of the rocking system in a plane 60 extending perpendicularly to the axis 49 through said axis 59.

Since the element 53 of the cardan joint 51 retains its position while the part of the inserted member 41 surrounding said element 53 is rocked round the center of the cardan joint on the pivotal axis 49, the bore in the inserted member 41 must flare conically in a downward direction in planes parallel with the plane 60.

FIG. 5 is a cross-section along said plane 60 through said system 58, which cross-section shows two different positions for the wheel 6. The position of the toothed annulus 25, of the sleeve 39, of the toothed rim 27 and of the pinion 29 are illustrated cross-sectionally through the wheel 6 in solid lines for the position corresponding to a zero angular setting and in dot-and-dash lines for the position corresponding to FIG. 1, that is with a pitch $\alpha$.

The carriage illustrated in FIG. 1 and provided with wheels sloping in the manner illustrated can execute an upward or downward movement along the tree trunk according to the direction of rotation of the shaft of the motor 8, provided said direction of rotation is reversible. If the motor can revolve only in the direction illustrated in FIG. 1 the wheels are designed such that the controlled motion of the carriage is performed along the tree in an upward direction.

For a downward movement of the carriage with reference to the tree, it would be necessary to make the wheel 6 become idle or to couple it with the rotor of the disconnected motor so that the carriage may run downwardly. In such cases, the wheels should be adapted to pivot out of a horizontal position at an angle $\alpha=0$ only to one side round their pivot, said pivots being those illustrated at 15, 20 or 45.

Figure 7:
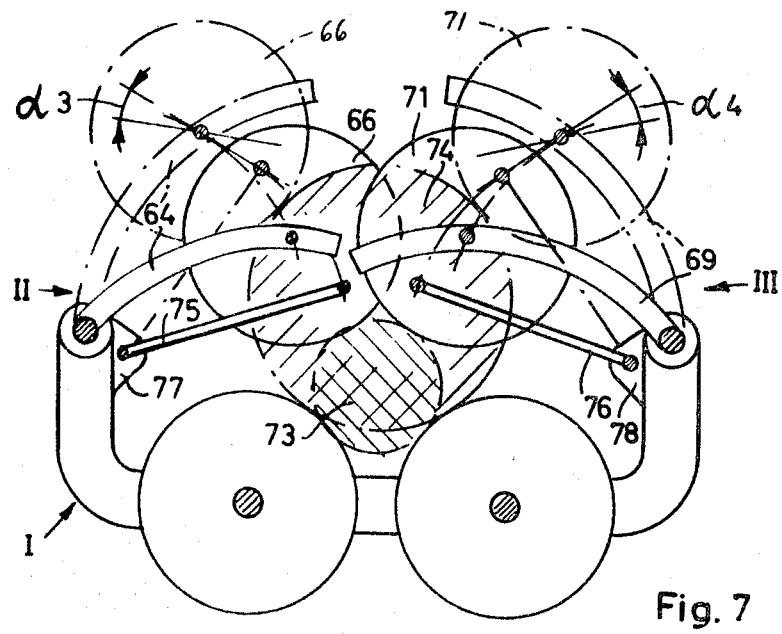
FIGS. 6 and 7 are schematic views from above of a carriage similar to that illustrated in FIG. 1 and including three sections of which the central or main section is advantageously provided with a driving motor and a shifting mechanism.
Figure 6:
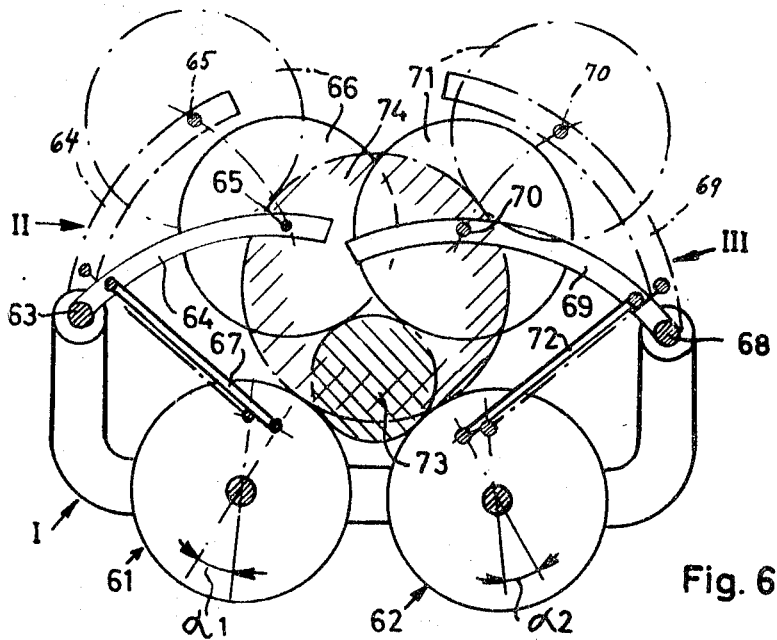

Instead of coupling the wheels 4 and 6 to ensure their simultaneous pivotal movement as illustrated in FIG. 1, which requires satisfying special conditions as concerns the peripheral size of the wheels and the arrangement of the coupling rods, it is also possible to provide at the free end of the bent tube 1 of the first carriage section I of FIG. 1 a further carriage section III adapted to pivot with reference to the section I in a manner similar to the pivotal connection of the section II, so as to ensure the shifting of the wheel 6 when the section III pivots with reference to the section I. FIGS. 6 and 7 illustrate such an arrangement including shifting rods both for the wheels on the carriage section I and for each wheel on the sections II and III.

As illustrated in FIG. 6, the first section I carries a shiftable loose wheel 61 and a driven wheel 62. To the left-hand side of the carriage section I, there is pivotally secured round a pivotal axis 63 the section II including an incurved tube 64 and a tubular upright 65 carrying a shiftable wheel 66, while the aforementioned adjusting or shifting rod 67, pivotally secured to said incurved tube 64, is connected with the control lever which is not illustrated and which controls the wheel 61.

To the right-hand side of the section I, there is pivotally secured in a similar manner round the pivotal axis 68 the third or further carriage section III including an incurved tube 69, a tubular upright 70 carrying a shiftable wheel 71, while a shifting tube 72 pivotally secured to the incurved rod 69 is connected with the control lever which is not illustrated and which controls the wheel 62.

FIG. 6 shows two tree trunks 73 and 74 of different diameters. Upon engagement of the carriage sections I, II and III with the tree trunk 73 of a smaller diameter, the shifting rods 67 and 72 and the further parts forming the sections II and III assume the positions illustrated in solid lines. In contradistinction, when the carriage sections I, II, III engage the tree trunk 74 having a larger diameter, said shifting rods 67 and 72 and the other parts forming the sections II and III lie in the positions illustrated in dot-and-dash lines.

When the carriage sections II and III move between the two positions illustrated in contacting relationship with the trees 73 and 74 respectively, the wheels are shifted by angles $\alpha 1$ and $\alpha 2$. In the case of a symmetrical position of the wheels 61 and 62 and of the carriage sections II and III with equal wheel diameters, the angular shifting of the wheels 61 and 62 when engaging two different cylindrical tree trunks is the same ($\alpha 1 = \alpha 2$).

FIG. 7 illustrates the case of a carriage provided with two pivotal sections II and III similar to those illustrated in FIG. 6, the parts being drawn in solid lines for one position of said sections and in dot-and-dash lines for the other, shifting rods 75, 76 for the wheels 66 and 71 being carried in this case by the carriage sections II and III. Said shifting rods 75 and 76 are pivotally secured at one end to the control lever for the corresponding wheel 66 or 71 and at other end to a point of the projection 77 or 78 rigid with the actual carriage section I, or to a point of the latter near such a projection.

When the carriage sections II and III move between the two positions corresponding to the two trees 73 and 74, the wheels 66 and 71 are shifted as in the case illustrated in FIG. 6, so that their angular setting is modified by a value $\alpha 3$ for 66 and $\alpha 4$ for 71. Said angular values $\alpha 3$ and $\alpha 4$ are equal as in the case of FIG. 6 for a symmetrical positioning of the wheels 66 and 71 and of the carriage sections II and III, the wheels having equal diameters and engaging cylindrical tree trunks. If the symmetry of the structure extends over all four wheels illustrated in FIGS. 6 and 7 and over their control levers the angular settings of all the wheels are equal.

In a practical embodiment of the arrangement described and if only small differences appear between the different wheels as concerns their angular setting, the carriage will follow the angular setting of the driven wheel or wheels.

FIG. 8 illustrates a further embodiment of a driven wheel adjustable as concerns its direction of running with a view to obtaining different angular settings thereof.

In FIG. 8, numeral 79 designates a tubular support rigidly secured to the carriage in a manner which is not illustrated, said support carrying a driven wheel 80.

Said tubular support 79 corresponds to the support 47 illustrated in FIG. 4. Inside the tubular support 79, there are fitted two pivots 81, 82 round which the wheel 80 is adapted to pivot; said wheel is provided with a series of teeth 83 along an annulus 84 rigid with a cylindrical ring 85, the two latter constituting a toothed wheel body. The ring 85 is carried by the spokes 86 of a hub or central part 87 revolving in unison through the agency of a stub-shaped end or projection 88 with a first element 89 of a cardan joint 90. The other element 91 of the cardan joint 90 revolves in unison with a driving shaft 92 carried in bearings rigid with the carriage. The center 93 of the cardan joint 90 lies on the rocking axis coaxial with the two pivots 81 and 82 longitudinally aligned with each other.

The cylindrical ring 85 is revolvably carried by an annular wheel support or core 96 with the interposition of a ball bearing 95. The pivots 81 and 82 extend inside radial bores formed in said annular support 96 the axial bore of which is engaged by the tubular support 79.

The description made with reference to FIG. 4 may serve also as an explanation of the rocking of the wheel 80 round the axis 94 by means of a control lever 97, and consequently the axial bore of the annular support 96 should flare in planes perpendicular to the axis 94, that is in a direction perpendicular to the plane of the drawing of FIG. 8, so as to open conically upwardly and downwardly of the axis 94.

A carriage according to FIGS. 6 and 7, incorporating the arrangement described for the shifting of the wheels, is illustrated in FIG. 9 in a schematic manner as a normal projection on a reference plane perpendicular to the medial axis of the engaged tree trunk or of a conical surface. This illustrates the conditions which are essential for obtaining graphically or through calculation the shape and size of the different parts of the arrangement.

The carriage illustrated is intended for moving over a tree trunk between a lower cross-section 100 having a peripheral size $Uu$ and an upper cross-section 101 having a peripheral size $Uo$. The four wheels 102, 103, 104, 105 are automatically adjustable as concerns their direction of progression. The wheels 102 and 103 are illustrated firstly in their positions $102u$ and $103u$ corresponding to their engagement with the lower cross-section 100 of the trunk and again in their positions $102o$ and $103o$ corresponding to their engagement with the upper cross-section 101.

For the positions in which FIG. 9 shows the carriage sections II and III with reference to the section I, the wheels drawn purposely with circular outlines are shifted out of their planes parallel with the reference plane with an angular setting different from zero, and they should actually be drawn on the reference plane as ellipses. Instead of drawing ellipses, only their major axes are shown, drawn as interrupted lines extending along the diameters of the wheels.

In order to obtain a constant pitch for the helical lines defining the path of the carriage, the wheels, at any point of the tree trunk including the lower and upper cross-sections 100 and 101, are adjusted automatically by the position of the carriage sections with reference to each other so as to be set at the desired angle $\alpha$. At the same time, the pitch $h$ should be equal to the length $l$ of the operative tool in the direction of a generating line of the tree trunk so that the following conditions should be obtained for the terminal positions of the carriage:

$$tg\alpha u = h/Uu \quad (1)$$
$$tg\alpha o = h/Uo \quad (2)$$

In a practical embodiment of the carriage, it was assumed that the periphery of the lower cross-section 100 was $$Uu = \pi Du = \pi 25 = 78.54 \text{ cm.} \quad (3)$$

and the periphery of the upper cross-section 101 was $$Uo = \pi Do = \pi 12 = 37.699 \text{ cm.} \quad (4)$$

For an operative tool of a length equal to 15 cm., for instance, there is obtained, assuming the pitch is the same at the upper and lower ends of the tree trunk, $$tg\alpha u = h/Uu = 15/78.54 \text{ that is } \alpha u = 10°50' \quad (5)$$
$$tg\alpha o = h/Uo = 15/37.699 \text{ that is } \alpha o = 11°40' \quad (6)$$

To make the carriage move with reference to the tree, the angular setting should, with the figures given hereinabove, rise for the wheel 102 from $\alpha u = 10°50'$ for the larger cross-section 100 by $$\Delta\alpha = \alpha o - \alpha u = 21°40' - 10°50' = 10°50' \quad (7)$$

until there is obtained for the smaller cross-section 101 an angular setting equal to $\alpha o = 21°40'$.

In order to obtain an accurate shifting of the wheel 104, the carriage section II illustrated in FIG. 9 includes an extension $a$ of its lever 106 to which the wheel 102 is pivotally secured; said extension lying beyond the pivot 107 is bent, in the case illustrated, with reference to the actual lever 106 in an anti-clockwise direction by a predetermined angle. It could as well be aligned with the lever 106 or else be bent angularly in a clockwise direction with reference to the lever 106.

To the free end of the extension forming a connecting point 108 there is secured a shifting link system of the type illustrated in perspective view in FIG. 1, said system leading to the lever controlling the wheel 104 which allows shifting said lever in accordance with the movements of the connecting point 108. The total angular shifting of the wheel 104 with reference to its pivotal axis, forming simultaneously the major axis 109 of the projected ellipse should as calculated hereinabove be equal, for the whole range of operation of the carriage, to $\Delta\alpha$ that is in the embodiment described to $10°50'$.

The angle through which the lever 106 shifts the wheel 102 out of the position $102u$ into its upper position $102o$ is equal to $\Delta\alpha$ as shown in FIG. 9. In the embodiment described said angle is equal to $36°$.

The lengths of the extension and of the control lever for the wheel 104 are such and the relative position of said parts is such that, as a consequence of the technical arrangement of the control and shifting means, a rocking of the extension $a$ through the complete angle $\beta$ extending in FIG. 9 between the points 108 and 112 shifts the shifting means, including the shifting lever, to an extent such that the wheel 104 is angularly shifted thereby through the complete differential angle $\Delta\alpha$.

It is furthermore of advantage that the connecting point terminating the extension $a$, when in a medial position on its path extending over an angle $\beta$ between the two points 108 and 112, and the connecting point with the shifting lever at the middle of its path through the angle $\Delta\alpha$, may be located in a manner such that the extension $a$ lies at least approximately in parallelism with the major axis of of the wheel 104, and the connecting point with the shifting lever or a part rigid with the latter lies at least approximately at a point of the plane perpendicular to the extension $a$ and passing through its end at the point 110, whereby the shifting lever must be given an operative length which can be defined graphically or by calculation.

FIG. 9 illustrates how the operative length of the shifting lever can be obtained graphically.

The major axis or pivotal axis of the wheel 104 is such that it is aligned with the center of the circular cross-section of the tree trunk to be treated illustrated at midheight of its operative area, while the extension $a$ starting from the pivotal point 107 is drawn in a manner such that it lies in parallelism with the diametrical rocking line 109 of the wheel 104. Through the terminal point 110 of the extension $a$ there is drawn at right angles with said extension $a$ perpendicular to said diametrical rocking axis 109, which perpendicular crosses said axis at 111.

There is then drawn, on said perpendicular, to the right and to the left of said crossing point 111 a vector $½(o+d)$, the terminal points obtained being designated by 113 and 114 while $c$ and $d$ designate the lengths of the chords between the points 108 and 110 and 110 and 112 respectively that is the chords of the arcs described by the end of the extension upon shifting through an angle $\beta$. There is formed at both end points 113 and 114 starting from the point 110 an angle of $90° - \Delta\alpha$ with a view to drawing the sides 116 and 117. The latter cross the diameter 109 at 115 where said lines 116 and 117 form an angle $½\Delta\alpha$ with said pivotal line. The distance between the crossing point 115 and the point 111 defines the desired operative length LVH of the shifting lever controlling the wheel 104.

FIG. 10 shows a shifting lever 119 for a wheel 120. Said shifting lever is not perpendicular to the plane in which the wheel 120 revolves and in contradistinction it should assume, between the terminal positions the wheel 120 is to occupy, a favorable medial position for the transmission of movement derived from a controlling connecting point 118. Such a shifting lever 119 should also lie outside a plane perpendicular to the pivotal diameter of the wheel. The connecting point for the shifting lever may however move in a plane perpendicular to the pivotal diameter of the wheel while the latter is being shifted provided the shifting lever projects angularly with reference to the pivotal diameter, and/or a section angularly rigid with the shifting lever carries the connecting point.

The operative length LVH of the shifting lever is then defined by the spacing in a perpendicular direction between the connecting point and the pivotal diameter.

According to FIG. 9, there is obtained between the angle $\Delta\alpha$, the operative lever length LVH to be given to the shifting lever, and the path $\frac{1}{2}(c+d)$ the condition $$tg\frac{\Delta\alpha}{2} = \frac{\frac{1}{2}(c+d)}{LVH} \quad (8)$$

or $$LVH = \frac{c+d}{2tg\frac{\Delta\alpha}{2}} \quad (9)$$

Furthermore, it is possible to set down with a large approximation $$c/a = \sin \beta/2 \text{ and } c = a \sin \beta/2 \quad (10)$$

$$d/a = \sin \beta/2 \text{ and } d = a \sin \beta/2 \quad (11)$$

$$c+d = 2a \sin \beta/2 \quad (12)$$

$$LVH = \frac{2a \sin \frac{1}{2}\beta}{2tg\frac{\Delta\alpha}{2}} = \frac{a \sin \frac{1}{2}\beta}{tg\frac{1}{2}\Delta\beta} \quad (13)$$

This means that the operative length of the shifting lever is proportional to the length of the extension $a$ and to the sine of one half of the pivotal angle provided for the carriage section II when shifted out of its position corresponding to the position of the wheel at 102u and that it is also reversely proportional to the tangent of one half distance between the maximum and minimum angular setting of the wheels within the range of operation of the carriage. Said conditions are valid stricto sensu for a constant pitch only when the above-mentioned conditions are at least approximately satisfied.

It is easy to see that a certain departure with reference to such conditions is not critical. This is the case in particular because:

(1) As apparent from inspection of FIG. 9, the range of operation of the carriage between the positions 102u and 102o of the section II is comparatively small with reference to the complete range within which the carriage section II is adapted to rock;

(2) The angle of the rocking, out of the medial position up to its limit positions, of the carriage section II, the extension $a$ and the shifting lever is comparatively small and the source of error is reduced;

(3) When selecting larger tree trunks and longer lever arms 106 with a carriage having a different operative range or in the case of a larger lever length with the above-described carriage, the angle $\beta$ may become smaller and consequently the different angles are also small; and (4) The pitch $h$ can be chosen so as to be comparatively small since the yield of the driving means for such carriages cannot be too large since otherwise the corresponding machines or apparatus would be too heavy and too large. When choosing a small pitch, the angle $\Delta\alpha$ remains also comparatively small.

The connecting point lying on the carriage section II beyond the pivotal point 107 can, as illustrated for a lever 123 for the carriage section III, be also provided on the lever itself so as to obtain a connecting point such as 122. The disclosure relating to the shifting lever and to its operative length is the same for the wheel 104 and 105. However the fact that the connecting point 108 lies on an extension $a$ while the connecting point 122 lies on the actual lever 123 ensures that during the movement of the carriage in a predetermined direction, one of the shifting levers, for instance the one controlling the wheel 104, must be drawn out by the corresponding shifting rod, while the other shifting lever, that is the one controlling the wheel 105 must be pushed so as to obtain the continuous change in the positions of the wheels with a view to adjusting the angular setting thereof.

As further illustrated in FIG. 9, the angular setting of the wheel 102 on the carriage section II is controlled by a connecting point 121 on the carriage section I, while that of the wheel 103 is controlled by the connecting point 122 on the same section I.

The spacing between the connecting points and the corresponding pivotal axes between two carriage sections, ensuring the adjustment of the angular setting through their mutual shifting, can always be of the same magnitude as already described for the spacing extension $a$ for the wheel 104. In such a case, the principles defined hereinabove remain valid for all the wheels, and the shifting levers are all of a same length.

However, it is possible to select for each wheel on the same carriage a different spacing for its connecting point. In such a case, the principles disclosed with reference to the wheel 104 may be retained in a similar manner but they lead, in accordance with Equation 13 to different operative lengths for the shifting levers.

Lastly, the wheel on the carriage section III can also be associated with the lever 106 of a length different from that disclosed. In such a case, the wheels 102 and 104, when equally spaced with reference to their connecting points, require different operative lengths for the shifting levers, in accordance with the Equation 13 by reason of the difference between the angles $\beta$.

Finally, the case should also be mentioned according to which the carriage can be constituted only by two sections, as illustrated in FIG. 1. In such a case, it is possible to provide each section for a same height of carriage with one or two wheels spaced with reference to each other and adapted to engage the tree trunk. In the case of the wheel lying nearer the pivotal axis which connects the two sections, the link system required is similar to that already disclosed. As to the other wheel lying at the same height but at a greater distance from said pivotal axis, it is possible to provide a similar but distinct link system executed under the same conditions but requiring somewhat longer links.

However, the shifting of such a second wheel may be obtained as well by other means according to which said second wheel is shifted by the first wheel when the latter is being shifted, as provided by connecting links wherethrough the movements of the first wheel are transmitted to the second wheel in a manner corresponding to the different positions of the wheels with reference to the tree trunk.

What I claim is:

1. A carriage for machines adapted to remove bark and branches from tree trunks, comprising at least two pivotally interconnected justaposed sections, wheels carried by said sections and adapted to engage a tree trunk with an angular setting defining a helical path followed by the carriage, a tool carried by the latter to engage the periphery of the tree trunk, a motor carried by one section of the carriage and controlling the rotation of at least one wheel, and means wherethrough the angular setting of said wheels is acted upon to increase with a closing of the angle between the corresponding sections, and to provide for the helical path, the pitch of the latter remaining at a value equal at a maximum to the operative length of said tool in the longitudinal direction of the tree trunk.

2. The carriage as defined in claim 1 wherein said means acting on the angular setting of said wheels ensure substantial constancy for the pitch within the operative range of the carriage.

3. The carriage as defined in claim 1, wherein at least one wheel is motor-driven and includes an inwardly toothed annulus and an outer toothed wheel body rigid with said annulus and adapted to engage the tree trunk, a pivot extending diametrically of said wheel body, carried by the corresponding carriage section and the axis of which, round which said one wheel rocks to assume the desired angular setting of said one wheel, extending through the point of engagement between said wheel body and the tree trunk, a pinion engaging the inner teeth of said annulus, a cardan joint, one element of which is rigid with said pinion while the other element thereof is pivotally connected with said one element at a point lying on the pivot axis, a core member round which said wheel body is revolvably secured and provided with a transverse bore revolvably carrying said pinion in its teeth-engaging position, and through which said other element extends freely, and a shaft revolvably carried by said corresponding carriage section and operatively connected with said other element.

4. The carriage as defined in claim 1, wherein at least one wheel is motor-driven and includes a hub, a toothed wheel body rigid with said hub and the teeth of which engage the tree trunk, a central core coaxial with said wheel body and revolvably carrying the latter, a coaxial cylindrical support for said core including pivotal means for said wheel body to allow its angular setting round a diametrical line of said wheel body passing through the point of engagement between the latter and the tree trunk, and further comprising a cardan joint, one element of which is adapted to rotate in unison with said hub, a shaft revolvably carried by the corresponding carriage section, and extending through said support and controlling the other element of said cardan joint.

5. The carriage as defined in claim 1, further comprising for at least one wheel a diametrical pivot the axis of which is stationary with reference to the corresponding carriage section, a wheel support carried by said pivot to rock round the axis of the latter and round which said one wheel is revolvably secured, the pivot axis being aligned with a radial line passing through the point of engagement between said one wheel and the tree trunk and also through the axis of the latter for the position of the carriage at mid-height of its operative longitudinal movement.

6. The carriage as defined in claim 5, wherein the pivot axis extends in the plane of symmetry of said one wheel.

7. The carriage as defined in claim 5, further comprising a lever rigid with said support and controlling the angular setting of said one wheel, and a ball bearing fitted between said support and said one wheel.

8. The carriage as defined in claim 7, wherein said lever is rigid with said support at a point spaced with reference to said pivot, and wherein said means acting on the angular setting of said one wheel includes shifting rods pivotally connected at one end with the corresponding lever of said one wheel and at the other end with a carriage section pivotally secured to another carriage section carrying said one wheel, whereby the relative angular movement of the two carriage sections considered produces predetermined changes in the angular setting of said one wheel and consequently in the pitch of the helical path.

9. The carriage as defined in claim 8, wherein the pivotal connection between said rods and cooperating carriage section is located, for a position of the carriage substantially at mid-height of a frusto-conical trunk surface to be treated, at a point such that its lever arm with reference to said carriage section is parallel with the pivoal axis of said one wheel and perpendicular to the pivotal line of connection between the corresponding sections, while the pivotal connection between said rod and said lever rigid with the corresponding support lies at a point of a plane passing through the first-mentioned point perpendicularly to the pivotal axis of said one wheel the last-mentioned point lying then in a medial position of its path corresponding to an angular shifting of the corresponding wheel equal to $\Delta\alpha$, the ratio between said lever arms at both pivotal connecting points being such that, within the range of operation of the carriage, the relative angular shifting $\beta$ of the two carriage sections considered shifts the first point through the same angle $\beta$ and said lever, and consequently said one wheel, through an angle $\Delta\alpha$ equal to the difference between the angular settings provided at the larger and at the smaller ends of the tree trunk, to be treated in a manner such that the pitch of the helical path remains substantially constant.

10. The carriage as defined in claim 8, wherein said rods are at right angles with said lever arms, connecting them with said lever and with the corresponding carriage section, while the angle by which said lever is shifted within the operative range of the carriage is equal to the difference $\Delta\alpha$ between the angular settings of the wheel selected for its engagement with the larger and with the smaller ends of the tree trunk to be treated, the angular settings being both defined so as to obtain for such positions of engagement the same predetermined pitch value, the relationship between the length LVH of said lever, said lever arm $a$ between said rod and the cooperating carriage section, and the angle $\beta$ defining the extent of relative pivotal movement between the two carriage sections considered being $LVH \, tg \, \tfrac{1}{2}\Delta\alpha = a \sin \tfrac{1}{2}\beta$.

References Cited

UNITED STATES PATENTS

| | | | |
|---|---|---|---|
| 2,583,971 | 1/1952 | Shuff | 144—3 |
| 2,612,724 | 10/1952 | Llewellyn | 144—208 |
| 3,315,714 | 4/1967 | Meier | 144—2 |
| 3,356,113 | 12/1967 | Peruga | 144—208 |

GERALD A. DOST, Primary Examiner

U.S. Cl. X.R.

144—208